US00RE37328B1

(19) United States

(12) Reissued Patent

Pecoraro et al.

(10) Patent Number: US RE37,328 E

(45) Date of Reissued Patent: Aug. 14, 2001

(54) TRANSPARENT INFRARED ABSORBING GLASS AND METHOD OF MAKING

(75) Inventors: George A. Pecoraro, Lower Burrell; Larry J. Shelestak, West Deer Township, both of PA (US)

(73) Assignee: PPG Industries Ohio, Inc., Cleveland, OH (US)

(21) Appl. No.: 07/567,461

(22) Filed: Jul. 27, 1990

Related U.S. Patent Documents

Reissue of:

(64) Patent No.: 4,792,536
Issued: Dec. 20, 1988
Appl. No.: 07/067,504
Filed: Jun. 29, 1987

U.S. Applications:

(62) Division of application No. 07/933,800, filed on Nov. 23, 1992, now abandoned.

(51) Int. Cl.[7] ..... C03C 3/087

(52) U.S. Cl. ..... 501/70; 501/64; 65/32.1; 65/135.9

(58) Field of Search ..... 501/70, 71; 65/32.1, 65/135.9

(56) References Cited

U.S. PATENT DOCUMENTS

| | | | | |
|---|---|---|---|---|
| Re. 25,312 | * | 1/1963 | Duncan et al. | 501/71 |
| 1,961,603 | * | 6/1934 | Berger . | |
| 2,505,001 | * | 4/1950 | Nordberg | 65/32 X |
| 2,755,212 | * | 7/1956 | Brown | 501/70 |
| 3,296,004 | * | 1/1967 | Duncan | 501/71 |
| 3,300,323 | * | 1/1967 | Plumat et al. | 501/71 |
| 3,343,935 | * | 9/1967 | Keffer et al. | 65/121 |
| 3,345,190 | * | 10/1967 | Albinak et al. | 65/32 X |
| 3,486,874 | * | 12/1969 | Rough | 65/146 |
| 3,578,430 | * | 5/1971 | Labrot | 65/32 X |
| 3,652,303 | * | 3/1972 | Rao | 65/32 X |
| 3,723,142 | * | 3/1973 | Kato et al. | 501/71 |
| 3,951,635 | * | 4/1976 | Rough | 65/135 |
| 3,971,646 | * | 7/1976 | Rhodes | 65/32 X |
| 4,104,076 | * | 8/1978 | Pons | 501/71 |
| 4,381,934 | * | 5/1983 | Kunkle et al. | 65/135 |
| 4,493,557 | * | 1/1985 | Nayak | 366/300 |
| 4,519,814 | * | 5/1985 | Demarest | 65/27 |
| 4,525,462 | * | 6/1985 | Behr | 501/71 |
| 4,529,428 | * | 7/1985 | Groetzinger | 65/27 |
| 4,539,034 | * | 9/1985 | Hanneken | 65/134 |
| 4,610,711 | * | 9/1986 | Matesa et al. | 65/134 |
| 4,866,010 | * | 9/1989 | Boulos et al. | 501/71 |
| 5,077,133 | | 12/1991 | Cheng | 428/426 |

FOREIGN PATENT DOCUMENTS

| | | | |
|---|---|---|---|
| 602115546 | * | 3/1985 | (JP) . |
| 611336936 | * | 6/1986 | (JP) . |
| 734152 | | 5/1980 | (SU) . |
| 948912 | | 8/1982 | (SU) . |

OTHER PUBLICATIONS

W. A. Weyl, "Colored Glasses," pp. 89–120 and 238–281.*

C. R. Bamford, "Color Generation and Control in Glass," 1977, pp. 35, 36, 78, 79, 106–109, 142–146.*

G. F. Brewster and N. J. Kreidl, "The Color of Iron—Containing Glasses of Varying Composition," J. Soc. Glass Techn., 1950, pp. 332–406.*

J. W. Forrest, N. J. Kreidl, Tyler G. Pett, "Color Variations in Glasses Containing Iron," J. Optical Soc. of Amer., vol. 38, No. 6, Jun. 1948, pp. 554–560.*

N. E. Densem and W. E. S. Turner, "The Equilibrium between Ferrous and Ferric Oxides in Glasses," J. Soc. Glass Techn., 1937, pp. 372–389.*

* cited by examiner

*Primary Examiner*—Karl Group

(74) *Attorney, Agent, or Firm*—Donald C. Lepiane

(57) ABSTRACT

A glass product having high visible transmittance, low infrared transmittance, and, optionally, reduced ultraviolet transmittance is produced in a manner compatible with continuous, commercial manufacture of flat glass by employing a moderate amount of iron in the glass composition and controlling reducing conditions to maintain a relatively large portion of the iron in the ferrous state.

34 Claims, 3 Drawing Sheets

TRANSPARENT INFRARED ABSORBING GLASS AND METHOD OF MAKING

Matter enclosed in heavy brackets [ ] appears in the original patent but forms no part of this reissue specification; matter printed in italics indicates the additions made by reissue.

*This application is a RE of Ser. No. 07/067,504 filed Jun. 29, 1987, U.S. Pat. No. 4,792,536, and a Div. of Ser. No. 07/933,800 filed Nov. 23, 1992, abandoned.*

BACKGROUND OF THE INVENTION

This invention relates to the production of glass that has low infrared energy transmittance and relatively high visible light transmittance. Such a glass is useful in glazing vision openings for the sake of reducing air conditioning requirements without unduly impairing vision, and is particularly applicable for vehicle windows.

The passage of infrared radiation through glass windows is a major cause of heat buildup in enclosed spaces such as automobiles. The accumulation of heat is, in turn, undesirable because of the burden placed on the air conditioning system, or because of the discomfort caused in occupants with or without air conditioning. The conventional approach has been to use "tinted" glass in such applications, which is usually darker green in color than ordinary "clear" glass due to a larger amount of iron included in the glass during melting. The iron renders the glass more absorptive of radiation in the infrared range of wavelengths (greater than 700 nanometers) and also reduces the visible light (luminous) transmittance. Conventional soda-lime-silica flat glass products tinted with iron typically transmit about 25 to 30 percent of the infrared radiation incident on a 5 millimeter thick sheet, and recently some products adapted to reduce infrared transmittance transmit less, approaching 15 percent transmittance levels. It would be desirable to reduce infrared transmittance levels even further, below the 15 percent level, without unduly decreasing luminous transmittance.

It is known in the art that infrared transmittance can be further reduced by including larger amounts of iron in the glass, but luminous transmittance is also reduced below levels considered desirable for adequate vision or for aesthetic purposes. It would be preferred to maintain luminous transmittance about 65 percent, preferably at least 70 percent. It is known that iron in the ferrous state ($Fe^{+2}$) is largely responsible for absorption of infrared energy in glass (W. A. Weyl, "Coloured Glass," page 91). Therefore, attaining lower infrared transmittance without substantially reducing luminous transmittance would theoretically be possible by maintaining reducing conditions during the glassmaking process so as to increase the amount of iron in the ferrous state for a given total iron concentration. Unfortunately, such an approach has significant drawbacks for commercial production of glass.

The automotive and architectural glass markets, to which infrared absorbing glass is directed, require mass production on a large scale, with the necessity of melting, refining, and forming the glass on a continuous basis. Most large scale production of glass is carried out in overhead fired, tank type, continuous melting furnaces. When the glass is a reduced condition so as to enhance the proportion of iron in the ferrous state, the glass becomes so absorptive that penetration of heat into the body of molten glass is rendered very difficult. The result is substantially reduced thermal efficiency, and at higher ferrous levels adequate melting and refining becomes impractical or impossible in a conventional furnace. A typical tinted glass with a ferrous to total iron ratio of about 25 percent (ferrous iron expressed as FeO and total iron expressed as $Fe_2O_3$) strains the ability of a commercial furnace to produce adequately melted and refined glass. Ferrous to total iron ratios in excess of 35 percent would heretofore have been considered unfeasible for continuous commercial flat glass production.

Another drawback for producing reduced glass on a continuous commercial basis is the conventional presence of substantial amounts of sulfur in soda-lime-silica glass, especially flat glass. Sulfur, typically included in the batch materials as a sulfate and analyzed in the glass as $SO_3$, is present as a melting and refining aid. Although much of the sulfur volatilizes during melting and refining, conventional commercially produced flat glass has a residual $SO_3$ content greater than 0.1 percent by weight of the glass, usually about 0.2 percent. In a glass composition that includes iron and sulfur, providing reducing conditions is known to create amber coloration which substantially lowers the luminous transmittance of the glass. In "Colour Generation and Control in Glass" by C. R. Bamford (Elsevier, 1977), on page 106, it is stated that "A rich golden-brown or amber colour is produced by the combination of sulphur and iron oxide in a soda-lime-silica glass melted under strongly reducing conditions." It is further stated on page 107 that "Onset of the amber colouration occurs at a ferrous value of 50 percent . . . " Therefore, in commercial flat glass manufacturing operations, the reliance on sulfur as a melting and refining aid has limited the degree to which the ferrous concentration of the glass could be increased to lower the infrared transmittance without unacceptably reducing the luminous transmittance. It would be desirable to be able to produce flat glass commercially with a ferrous content greater than 50 percent of the total iron content so as to minimize the total amount of iron needed to yield the desired infrared absorption.

Much of the published information on infrared absorbing glass is based on small scale, discontinuous, laboratory melts in which the commercial scale problems of achieving adequate melting and refining are usually not addressed. Small scale melts usually do not entail problems such as penetration of heat into a substantial depth of melt, limited residence time, homogenization of impurities from mineral batch materials or vessel erosion, and the presence of refining aids. This is because a batch-wise melting of a crucible or not of glass may be provided with indefinite melting times, may involve non-contaminating vessels of a material such as platinum, and may utilize purified grades of chemical compounds as raw materials. In the past, pot melts of glass having a desirable combination of infrared and luminous transmittance properties were produced in sufficient quantities to be cast, rolled, ground, and polished to produce flat glass plates that were marketed. Some of these melts had ferrous to total iron ratios between 40 percent and 50 percent. These pot melted glass compositions required long melting and refining times, were difficult to refine in spite of the user of sulfur refining aid, and were considered unsuitable for continuous flat glass production.

Japanese patent publication No. 60215546 (1985) has as its object a transparent, infrared absorbing glass wherein substantial amounts of barium oxide are included in the glass to shift the absorption peak toward the infrared wavelengths. However, barium oxide is a costly batch material, and it would be desirable to avoid the inconvenience of handling an additional batch constituent. Furthermore, it is taught that in glass in which sulfur is present as a refining aid, as would be the case with most commercially produced flat glass, substantial amount of zinc oxide should be included to prevent the formation of amber coloration when reducing conditions are imposed. But glass containing zinc oxide has been found to be incompatible with the float process, by which most flat glass is produced. This is due to the volatility of zinc oxide in the float forming chamber, which not only contaminates the interior of the chamber, but also leads to amber streaks in the glass where the zinc oxide content has been depleted.

Incompatibility with the float process also prevents the use of alternative refining aids such as antimony oxide or arsenic oxide instead of sulfur. Glass containing those constituents tend to discolor when brought into contact with molten tin in the float process. Fluorine and chlorine are also sometimes considered as alternatives to sulfur, but their volatility and associated environmental problems discourage their use.

U.S. Pat. No. 3,652,303 (Janakirama Rao) discloses the production of a reduced, heat absorbing glass by inclusion of tin oxide and chlorine in the glass. Providing tin as a substantial batch ingredient significantly increases the cost of the glass, and the volatility problems of chlorine are a drawback. It would be desirable if the combination of high visible light transmittance and low infrared transmittance could be attained with glass compositions not significantly different from stand, commercial, soda-lime-silica glass. It also appears that the Janakirama Rao glass compositions would not lend themselves to manufacture in a conventional continuous melting furnace.

Reducing the amount of transmitted ultraviolet radiation is also a desirable feature for the sake of reducing the fading of fabrics and other interior components. Japanese patent publication No. 61136936 (Asahi Glass) provides titanium dioxide to improve the ultraviolet blocking properties of glass and asserts that reduction in infrared transmittance is also achieved. However, the effect of titanium dioxide on infrared transmittance is less than desired as evidenced by the total solar energy transmittance of 51 percent reported in the Japanese patent document for five millimeter thick glass. Since infrared transmittance is the major component of total solar energy transmittance, the total solar energy transmittance of a satisfactory infrared absorbing glass would be less than 50 percent and preferably less than 40 percent. The primary object of the present invention is to provide low infrared transmittance, but additionally providing low ultraviolet transmittance would also be desirable.

SUMMARY OF THE INVENTION

The present invention provides a soda-lime-silica flat glass composition and a process for its commercial manufacture whereby infrared transmittance is less than 15 percent, preferably less than 14 percent, and luminous transmittance is greater than 65 percent, preferably at least 70 percent. Such a glass exhibits a total solar energy transmittance within the range of 30 to 45 percent, typically between 32 and 40 percent. This combination of properties has been found to be yielded when glass containing a moderate amount of iron is produced under relatively reducing conditions so as to enhance the proportion of iron in the ferrous state. The total amount of iron is preferably about 0.45 to 0.65 percent of the total glass composition, expressed as $Fe_2O_3$. Greater than 35 percent, preferably at least 40 percent, and most preferably at least 50 percent of the total iron content (as $Fe_2O_3$) is provided in the ferrous state (as FeO) by maintaining reducing conditions in the melting and/or refining processes. Effective and efficient melting and refining of such a reduced glass on a large scale, continuous basis are provided by employing techniques that avoid a requirement for transmittance of radiant energy through a substantial thickness of the melt. Thus, overhead fired, tank type melting furnaces are avoided for purposes of this aspect of the present invention. Various non-conventional melting and refining techniques may be suitable for this purpose, but a preferred arrangement is one in which the melting and refining process is separated into discrete stages, without a large volume of melt being retained in any stage. The initial melting stage is preferably that disclosed in U.S. Pat. No. 4,381,934 (Kunkle et al.). Refining may be carried out in a subsequent stage by the techniques disclosed in U.S. Pat. Nos. 4,539,034 (Hanneken) or 4,610,711 (Matesa et al.) for example. A preferred technique for refining is by means of vacuum as disclosed in U.S. patent application Ser. No. 894,143 filed Aug. 7, 1986, by G. E. Kunkle et al., the disclosure of which is hereby incorporated by reference. Another sequence of discrete melting and refining stages is shown in U.S. Pat. No. 3,951,635 (Rough). Alternatively, it may be feasible to adapt electric melting means to melt the reduced glass of the present invention, either as the sole melting means or as an adjunct to combustion melting, but electric melting for large scale flat glass manufacturing is usually disadvantageous economically.

In another aspect of the invention, the desired combination of low infrared transmittance with high luminous transmittance is attained with minimized total iron content, highly reduced glass (above 50 percent ferrous), and very low sulfur content (less than 0.02 percent $SO_3$, preferably less than 0.01 percent $SO_3$). The lower sulfur levels are attained by the avoidance of sulfur-containing refining aids, preferably avoiding all deliberate inclusion of sulfur in the batch materials (some may be present as impurities). To be able to continuously melt and refine without a chemical refining aid entails selection of processing techniques other than the conventional use of combustion fired tank type furnaces that involve deep pools of molten glass. The use of melting and refining processes that are based on discrete stages with minimal volumes of molten material being retained are preferred, as described previously. The use of vacuum to assist the refining process is particularly desirable in this regard in that the vacuum actively removes sulfur from the melt, thereby reducing the sulfur content to a mere trace and further lessening the tendency of reduced glass to form amber coloration. For the sake of compatibility with the float process, and for environmental purposes, alternative chemical refining aids such as arsenic and antimony are also avoided.

The iron colorant may included in the batch mixture and pass through the entire melting and refining process, or it may be added at an intermediate point. A particularly advantageous technique for adding the colorant to the molten glass after refining and before forming is disclosed in U.S. patent application Ser. No. 26 filed Jan. 2, 1987, by G. A. Pecoraro and J. A. Gulotta, the disclosure of which is hereby incorporated by reference. Adding the colorant at a downstream location has the advantage of expediting color changes because of the relatively low volume of residual colored glass in the system. Whether mixed with the batch or added to the molten glass, it is advantageous to use iron colorant sources that include relatively high concentrations of iron in the ferrous state or elemental iron. An ptional approach that has economic advantages is to provide a base concentration of iron by including conventional $Fe_2O_3$ containing sources in the batch and increasing the amount of iron in the ferrous state by adding a colorant high in FeO at a downstream location.

An optional feature of the invention is the inclusion in the glass of agents that reduce the ultraviolet transmittance of the glass. Oxides of cerium, titanium, molybdenum or vanadjium singly or in combination have the effect of reducing ultraviolet transmittance through the glass. For the sake of maintaining high luminous transmittance, cerium oxide is preferred. Cerium oxide content of the glass at levels of about 0.25 percent to 0.5 percent have been found to reduce the ultraviolet transmittance to less than 50 percent, preferably less than 40%, at a thickness of 5 millimeters. Larger amounts of cerium oxide reduce the ultraviolet transmittance even further, but cerium oxide has the effect of increasing infrared transmittance, and additional amounts of cerium oxide may unduly compromise the overall transmittance properties of the glass, depending upon the requirements of a particular application. For reducing total solar energy transmittance, the infrared transmittance is a far more significant factor than is the ultraviolet transmittance.

THE DRAWINGS

DETAILED DESCRIPTION

The detailed description will be set forth in conjunction with a preferred method and apparatus specifically adapted for melting glass in discrete stages which have been found to be advantageous for controlling reducing conditions and for accomplishing the tasks of melting and refining without some of the restraints of conventional glassmaking furnaces.

Figure 1:
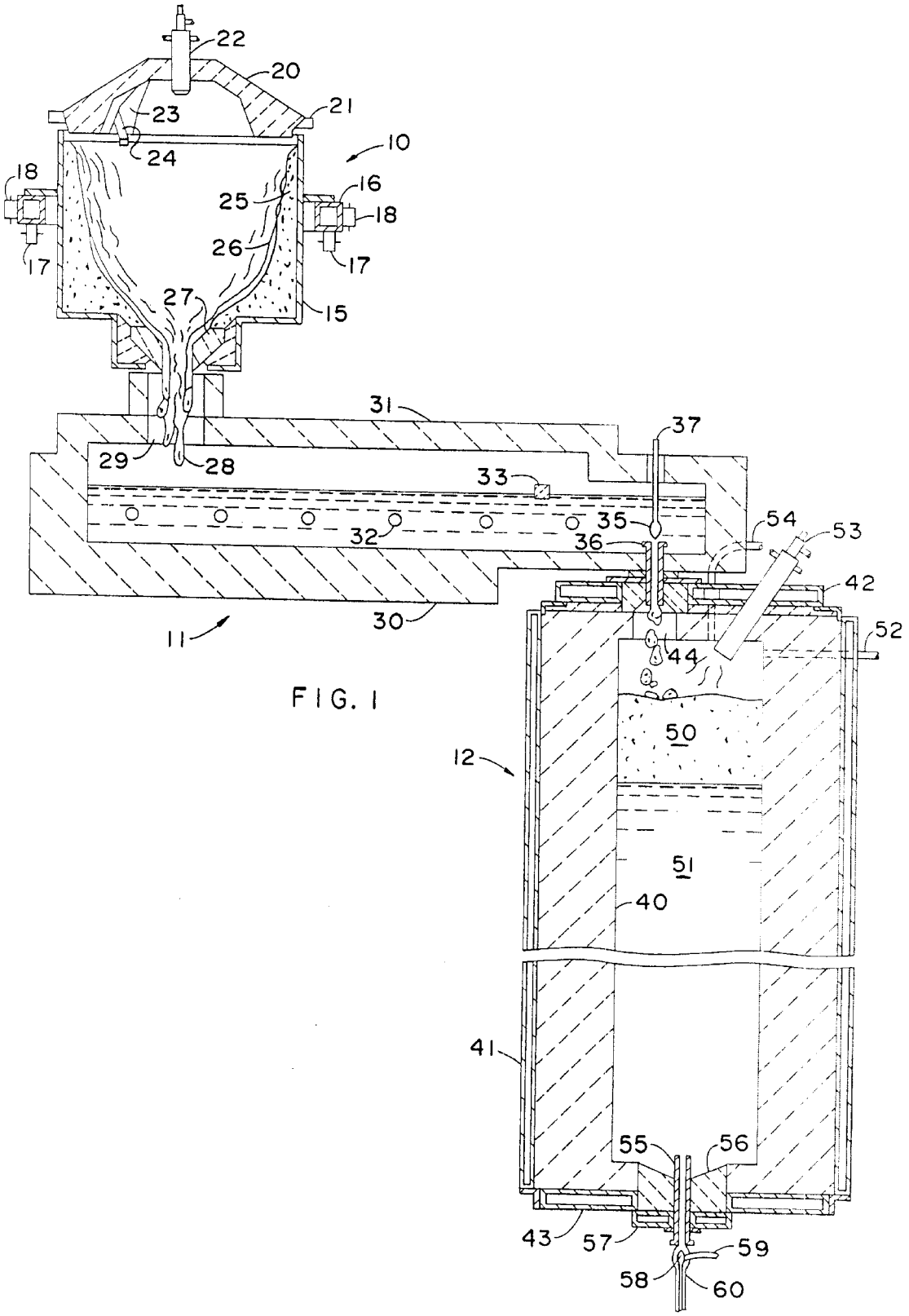
FIG. 1 is a cross-sectional view of a preferred embodiment of melting and refining apparatus for carrying out the process of the present invention.

Referring to FIG. 1, the overall melting process of the preferred embodiment consists of three stages: a liquefaction stage 10, a dissolving stage 11 and a vacuum refining stage 12. Various arrangements could be employed to initiate the melting in the liquefaction stage 10, but a highly effective arrangement for isolating this stage of the process and carrying it out economically is that disclosed in U.S. Pat. No. 4,381,934 which is hereby incorporated by reference for details of the preferred liquefaction stage embodiment. The basic structure of the liquefaction vessel is a drum 15 which may be fabricated of steel and has a generally cylindrical sidewall portion, a generally open top, and a bottom portion that is closed except for a drain outlet. The drum 15 is mounted for rotation about a substantially vertical axis, for example, by means of an encircling support ring 16 rotatably carried on a plurality of support wheels 17 and held in place by a plurality of aligning wheels 18. A substantially enclosed cavity is formed within the drum 15 by means of a lid structure 20 which is provided with stationary support by way of a peripheral frame 21, for example. The lid 20 may take a variety of forms as may be known to those of skill in the art of refractory furnace construction. The arrangement depicted in FIG. 1 is an upwardly domed, sprung arch construction fabricated from a plurality of refractory blocks, but flat suspended designs could be employed for the lid. Water-cooled, metallic lid designs may be used to some advantage.

Heat for liquefying the batch material may be provided by one or more burners 22 extending through the lid 20. Preferably, a plurality of burners are arranged around the perimeter of the lid so as to direct their flames toward a wide area of the material within the drum. The burners are preferably water cooled to protect them from the harsh environment within the vessel. Exhaust gases may escape from the interior of the liquefaction vessel through an opening 23 in the lid. Advantageously the waste heat in the exhaust gases may be used to preheat the batch material in a preheating stage (not shown) such as that disclosed in U.S. Pat. No. 4,519,814.

Batch materials, preferably in a pulverulent state, may be fedinto the cavity of the liquefying vessel by means of a chute 24, which in the embodiment depicted extends through the exhaust opening 23. Details of the feed chute arrangement may be seen in U.S. Pat. No. 4,529,428. The batch chute 24 terminates closely adjacent to the sidewalls of the drum 10, whereby batch material is deposited onto the inner sidewall portions of the drum. A layer 25 of the batch material is retained on the interior walls of the drum 10 aided by the rotation of the drum and serves as an insulating lining. As batch material on the surface of the lining 25 is exposed to the heat within the cavity, it forms a liquefied layer 26 that flows down the sloped lining to a central drain opening at the bottom of the vessel. The outlet may be fitted with a ceramic refractory bushing 27. A stream of liquefied material 28 falls freely from the liquefaction vessel through an opening 29 leading to the second stage 11.

In order to provide reducing conditions for the purposes of the present invention the burner or burners 22 may be operated with an excess amount of fuel relative to the amount of oxygen being supplied to each burner. A ratio of 1.9 parts by volume oxygen to one part by volume natural gas has been found satisfactory for effecting the desired reduction levels in the glass. Reduction conditions may be enhanced in the liquefaction stage 10 by including a reducing agent in the batch mixture being fed to that stage. The reducing agent may be a finely divided carbon-containing material such as coal, which may be provided in an amount constituting about 0.01 to 0.05 percent by weight of the total batch. Coal in the amount of 0.025 percent was found to be satisfactory in combination with reducing burner flames.

The second stage may be termed the dissolving vessel because one of its functions is to complete the dissolution of any unmelted grains of batch material remaining in the liquefied stream 28 leaving the liquefaction vessel 10. The liquefied material at that point is typically only partially melted, including unmelted and grains and a substantial gaseous phase. In a typical soda-lime-silica melting process using carbonate batch materials, the gaseous phase is chiefly comprised of carbon oxides. Nitrogen may also be present from entrapped air.

The dissolving vessel 11 serves the function of completing the dissolution of unmelted particles in the liquefied material coming from the first stage by providing residence time at a location isolated from the downstream refining stage. Soda-lime-silica glass batch typically liquefies at a temperature of about 2200° F. (1200° C.) and enters the dissolving vessel 11 at a temperature of about 2200° F. (1200° C.) to about 2400° F. (1320° C.) at which temperature residual unmelted particles usually become dissolved when provided with sufficient residence time. The dissolving vessel 11 shown is in the form of a horizontally elongated refractory basin 30 with a refractory roof 31, with the inlet and outlet at opposite ends thereof so as to assure adequate residence time. The depth of molten material in the dissolving vessel may be relatively shallow in order to discourage recirculation of material.

Although the addition of substantial thermal energy is not necessary to perform the dissolving step, heating can expedite the process and thus reduce the size of the dissolving vessel 11. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vaccum is employed to assist refining, lower peak refining temperatures may be used without sacrificing product quality. The amount by which temperatures can be reduced depends upon the degree of vacuum. Therefore, when refining is to be performed under vacuum in accordance with the preferred embodiment, the glass temperature need be raised to no more than 2700° F. (1480° C.), for example, and optionally no more than 2600° F. (1430° C.) prior to refining. When the lower range of pressures disclosed herein are used, the temperature in the refining vessel need be no higher than 2500° F. (1370° C.). Peak temperature reductions on this order result in significantly longer life for refractory vessels as well as energy savings. The liquefied material entering the dissolving vessel need be heated only moderately to prepare the molten material for refining. Combustion heat sources may be used in the dissolving stage 11, but it has been found that this stage lends itself well to electric heating, whereby a plurality of electrodes 32 may be provided as shown in FIG. 1 extending horizontally through the sidewalls. Heat is generated by the resistance of the melt itself to electric current passing between electrodes in the technique conventionally employed to electrically melt glass. The electrodes 32 may be carbon or molybdenum of a type well known to those of skill in the art. A skimming member 33 may be provided in the dissolving vessel to prevent any floating material from approaching the outlet end.

A valve controlling the flow of material from the dissolving stage 11 to the refining stage 12 is comprised of a plunger 35 axially aligned with a drain tube 36. The shaft 37 of the plunger extends through the roof 31 of the dissolving vessel so as to permit control over the gap of the plunger 35 and the tube 36 to thereby modulate the rate of flow of material into the refining stage. Although the valve arrangement is preferred, other means could be provided to control the flow rate of molten material to the refining stage as are known in the art. An example would be the use of heating and/or cooling means associated with the drain tube so as to modulate the viscosity, and thus the flow rate, of the molten material passing therethrough.

The refining stage 12 preferably consists of a vertically upright vessel that may be generally cylindrical in configuration having an interior ceramic refractory lining 40 shrouded in a gas-tight, water-cooled casing. The refractory may be an alumina-zirconia-silica type well known in the art. The casing may include a double walled, cylindrical sidewall member 41 having an annular water passageway therebetween and circular end coolers 42 and 43. A layer of insulation (not shown) may be provided between the refractory 40 and the sidewall 41. The valve tube 36 may be fabricated of a refractory metal such as platinum and is sealingly fitted into an orifice 44 at the upper end of the refining vessel.

As the molten material passes through the tube 36 and encounters the reduced pressure within the refining vessel, gases included in the melt expand in volume, creating a foam layer 50 resting on a body of liquid 51. As foam collapses it is incorporated into the liquid body 51. Subatmospheric pressure may be established within the refining vessel through a vacuum conduit 52 extending through the upper portion of the vessel. As used herein, "foaming" can be considered to be characterized by at least a doubling of the volume of the molten material. A definition of the state of being completely foamed is that the bubble membranes are in contact with other each. If the material is completely foamed, the volume increase is usually much greater than double. Distributing the molten material as thin membranes of a foam greatly increases the surface area exposed to the reduced pressure. Therefore, maximizing the foaming effect is preferred. It is also preferred that the foam be exposed to the lowest pressures in the system, which are encountered at the top of the vessel in the headspace above the liquid, and therefore exposure is improved by permitting newly introduced, foamed material to fall through the headspace onto the top of the foam layer. Also, it is more consistent with the mass transfer in the vessel to deposit freshly foamed material onto the top of the foam layer rather than generating foam from the surface of the liquid pool beneath the foam layer. Depending upon the pressure in the vacuum space and the volume flow rate of the molten material entering the refining vessel, the entering stream may either penetrate through the foam layer as a generally coherent liquid stream, whereby foaming occurs from the surface of the pool 51, or the stream may foam immediately upon encountering the reduced pressure. Either mode can be used, but for the reasons stated above, the latter mode has been found to be more effective.

The heat content of the molten throughput material entering the refining vessel 12 can be sufficient to maintain suitable temperatures within the vessel, but at lower throughput rates energy losses through the walls may exceed the rate at which energy is being transported into the vessel by the molten material. In such a case, it may be desirable to provide heating within the refining vessel for the sake of avoiding undue temperature reduction. The amount of heating could be relatively minor since its purpose would be merely to offset heat losses through the walls, and may be carried out by conventional electric heating arrangements whereby electrodes extend radially through the side wall and electric current is passed between the electrodes through the glass.

Regardless of the throughput rate, the space above the molten body 51 in the vessel 12 can tend to be cooler than desired because of the absence of the molten mass and because radiation from the molten mass is insulated by the foam layer 50. As a result, the upper portion of the foam layer can become cooler, which in turn increases the viscosity of the foam and slows the rate at which gases are expelled. In that case, it has been found advantageous to provide means for heating the headspace above the liquid and foam. For this purpose, it has been found feasible to provide a burner 53 and to sustain combustion with the vacuum space. A conduit 54 may be provided at the upper end of the vacuum vessel whereby a small amount of water may be sprayed onto the foam periodically. The water spray has been found to assist the foam to collapse.

Figure 2:
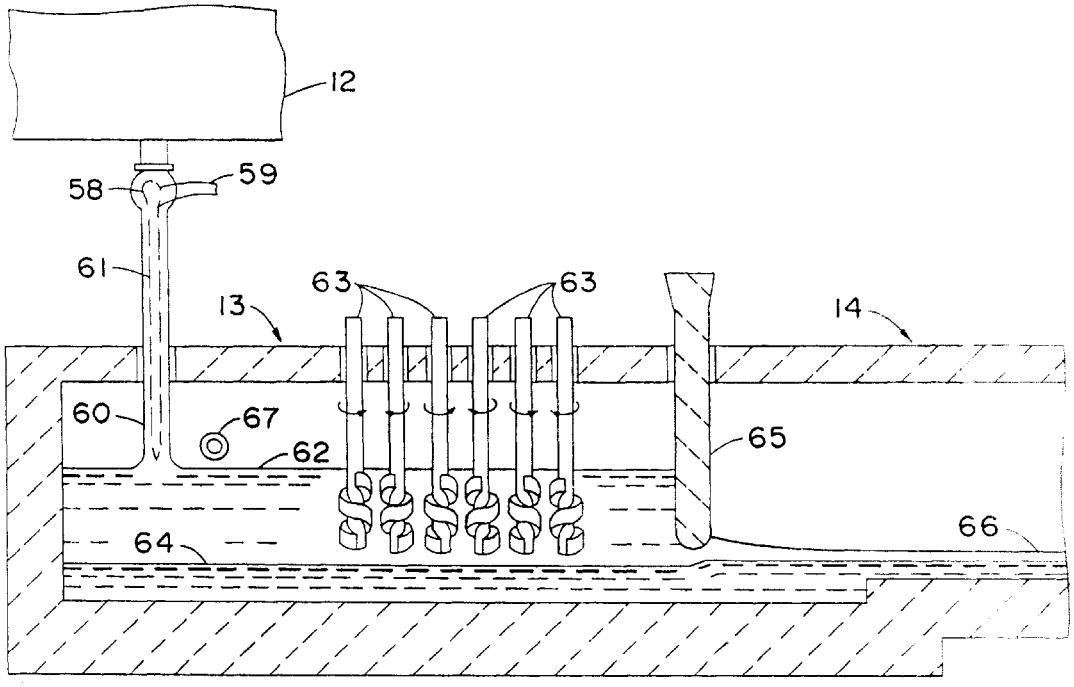
FIG. 2 is a cross-sectional view of a preferred embodiment of a colorant addition and homogenizing apparatus that may be employed for carrying out the process of the present invention.

In the embodiment depicted, refined molten material is drained from the bottom of the refining vessel 12 by way of a drain tube 55 of a refractory metal such as platinum. It would also be feasible to locate the drain in a side wall of the vessel in the region of the bottom. The drain tube 55 preferably extends above the surface of the refractory bottom section 56 within which it is mounted to prevent any debris from entering the output stream. Leakage around the tube is prevented by a water cooler 57 under the bottom section 56. The flow rate of molten material from the drain tube 55 is controlled by a conical throttle member 58 carried at the end of a stem 59. The stem 59 is associated with mechanical means (not shown) to adjust the elevation of the throttle member 58 and thus adjust the gap between the throttle member and the tube 55 so as to control the flow rate therefrom. A molten stream 60 of refined material falls freely from the bottom of the refining vessel and may be passed to the subsequent stage as shown in FIG. 2.

The height of molten material 51 retained in the refiner 12 is dictated by the level of vacuum imposed in the chamber. The pressure head due to the height of the liquid must be sufficient to establish a pressure equal to or greater than atmospheric at the outlet to permit the material to drain freely from the vessel. The height will depend upon the specific gravity of the molten material, which for soda-lime-silica glass at the temperatures in the refining stage is about 2.3. A height in excess of the minimum required to offset the vacuum may be desired to account for fluctuations in atmospheric pressure, to permit variation of the vacuum, and to assure steady flow through the outlet.

The benefits of vacuum on the refining process are attained by degrees; the lower the pressure, the greater the benefit. Small reductions in pressure below atmospheric may yield measurable improvements, but to economically justify the vacuum chamber, the use of substantially reduced pressures are preferred. Thus, a pressure of no more than one-half atmosphere is preferred for the appreciable refining improvements imparted to soda-lime-silica flat glass. Significantly greater removal of gases is achieved at pressures of one-third atmosphere or less. More specifically, a refining pressure below 100 torr, for example 20 to 50 torr, is preferred to yield commercial float glass quality of about one seed per 1,000–10,000 cubic centimeters. Seeds less than 0.01 millimeter in diameter are considered imperceptible and are not included in the seed counts.

Typically, flat glass batch includes sodium sulfate as a melting and refining aid in the amounts of about 5 to 15 parts by weight per 1000 parts by weight of the silica source material (sand), with about 10 parts by weight considered desirable to assure adequate refining. When operating in accordance with the preferred embodiment, however, it has been found preferable to restrict the sodium sulfate to two parts by weight, and yet it has been found that refining is not detrimentally affected. Most preferably, the sodium sulfate is utilized at no more than one part per 1000 parts sand, with one-half part being a particularly advantageous example. These water ratios have been given for sodium sulfate, but it should be apparent that they can be converted to other sulfur sources by molecular weight ratios. Complete elimination of refining aids is feasible with the present invention, although trace amounts of sulfur are typically present in other batch materials and colorants so that small amounts of sulfur may be present even if no deliberate inclusion of sulfur is made in the batch. Moreover, the vacuum treatment has been found to reduce the concentration of volatile gaseous components, particularly the refining aids such as sulfur, to levels lower than the equilibrium levels attained with conventional processes. Soda-lime-silica glass products that are mass-produced by conventional continuous melting processes are characterized by significant amounts of residual refining aids. Such products would include glass sheets suitable for glazing vision openings in buildings or vehicles (e.g., float glass) and container were (e.g., bottles). In such products, the residual sulfur content (expressed as $SO_3$) is typically on the order of 0.2% by weight and seldom less than 0.1%. Even when no deliberate addition of sulfur refining aid is made to the batch, at least 0.02% $SO_3$ is usually detected in a soda-lime-silica glass made in a conventional continuous melter. Flat glass for transparent vision glazing applications normally has more than 0.05% $SO_3$. In distinction thereto, soda-lime-silica glass can be produced continuously by the preferred embodiment disclosed herein with less than 0.02% residual $SO_3$, even when relatively small amounts of sulfur refining aid are being included in the batch as described above, and less than 0.01% $SO_3$ when no deliberate inclusion of sulfur is being made. At the lowest pressures, with no deliberate sulfur addition, $SO_3$ contents less than 0.005% are attainable. Commercial soda-lime-silica glass of the type that is usually refined with sulfur compounds may be characterized as follows:

| | Weight % |
|---|---|
| $SiO_2$ | 66–75 |
| $Na_2O$ | 12–20 |
| CaO | 7–12 |
| MgO | 0–5 |
| $Al_2O_3$ | 0–4 |
| $K_2O$ | 0–3 |
| $Fe_2O_3$ | 0–1 |

Small amounts of colorants or other refining aids may also be present. Arsenic, antimony, fluorine, chlorine and lithium compounds are sometimes used as refining aids, and residues may be detected in this type of glass. A sheet of float glass or a bottle represent common commercial embodiments of the above composition.

A sheet of glass that has been formed by the float process (i.e., floated on molten tin) is characterized by measurable amount of tin oxide that migrated into surface portions of the glass on at least one side. Typically a piece of float glass has an $SnO_2$ concentration of at least 0.05% by weight in the first few microns below the surface that was in contact with the tin. Because the float process entails a relatively large scale continuous melting furnace of the type that conventionally employs significant amounts of sulfur-containing refining aids, float glass is characterized by minimum $SO_3$ concentrations higher than those discussed above for soda-lime-silica glass in general. Therefore, float glass refined by the present process having less than 0.08% $SO_3$ would be distinguished from conventional commercially available float glass. Most float glass falls within the following compositional ranges:

| | |
|---|---|
| $SiO_2$ | 72–74% by weight |
| $Na_2O$ | 12–20 |
| CaO | 8–10 |
| MgO | 3–5 |
| $Al_2O_3$ | 0–2 |
| $K_2O$ | 0–1 |
| $Fe_2O_3$ | 0–1 |

Colorants and traces of other substances may be present.

FIG. 2 shows a stirring arrangement that may be employed to introduce transmittance altering additives into the glass after it has been refined. Such an arrangement is optional, but is preferred in that it permits more rapid changes in color because a smaller volume of residual glass is involved. All of the additives may be added at the stirring stage, or a base level of some or all of the radiation absorbing elements such as iron may be provided throughout the process with additional amounts being added at the stirring stage. The glass entering the stirring stage is advantageously in a reduced condition so that substantial portions of iron being added will tend to be converted to or remain in the ferrous state.

The particular embodiment illustrated in FIG. 2 includes a stirring chamber 13 within which the stream of glass 60 is received from the refining vessel 12. A preferred feature is the provision of a rod 61 extending downwardly from the valve member 58, which assures a regular streamlined path for the vertically flowing glass so as to avoid entrapment of air into the glass as it enters a body of glass 62 contained within the stirring chamber. The glass 62 is preferably above 2200° F. (1200° C.) during stirring. Therefore, the stream of glass 60 entering the stirring chamber is at least at that temperature.

For purposes of the present invention the stirring chamber 13 is not limited to any particular structure of stirrer, any of the various mechanical devices that have been proposed for stirring molten glass in the prior art being usable. Some arrangements may be more effective than others in homogenizing the glass, but the number of stirrers and their speed of rotation can be selected to compensate for variations in efficiency. The particular stirrer structure shown in FIG. 2 is a preferred example in that it provides a strong mixing action and is a type that is readily available commercially. Another embodiment that may be suitable is that disclosed in U.S. Pat. No. 4,493,557 (Nayak et al.). Each of the stirrers 63 as depicted in FIG. 2 is comprised of a helical stirring portion at the bottom of a shaft, both of which may be cast from a ceramic refractory material. In order to avoid drawing air into the melt, it is preferred to rotate the helical stirrers in such a direction that they draw the molten glass upwardly toward the surface. This also serves to prevent additives that may be deposited onto the surface of the melt in the stirring chamber from being swept prematurely, and in concentrated streaks, into the zone of active stirring. Drive means, (not shown), for rotating the stirrers may be of any suitable type employed in the art for this purpose. For the sake of convenience, the stirrers in a transverse row, for example, may be rotated in the same direction, and to enhance shearing forces imparted to the glass it is preferred to rotate the adjacent transverse row in the opposite direction as shown in the drawings. It should be understood, however, that any pattern of rotation could be employed for the present invention as long as adequate homogenization is achieved. In order to achieve good homogeneity, it is considered desirable to stir substantially the entire transverse cross-sectional area of the molten glass in the stirring chamber, and the number and size of stirrers may be selected accordingly. Thus, in the embodiment shown in FIG. 2, the helical portion of each stirrer corresponds to virtually the depth of the molten glass, and an array of closely spaced stirrers is provided that actively affects substantially the full width of molten material in the stirring chamber. The degree of homogenization is also influenced by the amount of agitation experienced by each increment of the melt and by the throughput rate of the melt. Thus, a plurality of rows of stirrers is preferred so that each increment of glass is repeatedly subjected to mixing forces as it passes along the length of the stirring chamber. The number of rows of stirrers will depend upon the degree of homogenization desired, and the throughput rate of glass. As a general guideline, one stirrer may be provided for each 10 tons per day of glass produced for average quality flat glass. Obviously, for some applications lower quality requirements may permit the use of fewer stirrers. On the other hand, the use of a larger number of stirrers will usually produce improved results.

As optional feature, preferred for making higher quality flat glass, of the arrangement shown in FIG. 2 is that the stirring chamber 13 is integrated with a float forming chamber 14, whereby the glass 62 in the stirring chamber rests on a layer of molten metal 64. The molten metal may be continuous with the molten metal constituting the support in the forming chamber, and is usually comprised essentially of tin. Such an arrangement avoids contaminating refractory content on the bottom and permits delivery of the glass immediately after being stirred so as to minimize the area of refractory subsequently contacted by the glass. It has also been found that the contact with molten metal in the stirring chamber tends to have a reducing effect on the glass, which is advantageous for attaining the transmittance properties of the present invention. In FIG. 2, a vertically adjustable tweel 65 regulates the flow of molten glass from the stirring chamber onto the molten metal 64 within the forming chamber 14. The glass forms a ribbon 66, which is reduced in thickness and cools as it is drawn along the molten metal pool until it cools to a temperature sufficient to be withdrawn from the molten metal without marring the surface of the glass ribbon.

Because the molten glass is stirred at relatively high temperatures, and is immediately thereafter delivered to the forming chamber in this embodiment, the glass enters the forming chamber at a temperature higher than is conventional for a float type forming process. The temperature of the glass may fall somewhat from the stirring temperature, which is above 2200° F. (1200° C.). but will typically enter the forming chamber before the glass has cooled to a conventional float process delivery temperature of about 1900° F. to 2000° F. (1040° C. to 1090° C.). Typically the glass entering the forming chamber in the FIG. 2 embodiment of the present invention will be at a temperature of at least about 2100° F. (1150° C.), at which temperature the viscosity of the glass does not lead itself to engagement by mechanical means for attenuating the glass ribbon to the desired thickness in the forming chamber. Therefore, a forming process that employs elevated pressure within the forming chamber, preferably the process disclosed in U.S. Pat. No. 4,395,272 (Kunkle et al.), lends itself to use with those embodiments of the present invention in which the stirred glass is delivered at relatively high temperature to the forming chamber.

For adding coloring agents or additives to the molten glass in the stirring chamber, a screw feeder 67 may be provided, which may, for example, extend horizontally from the side wall near the location at which the stream of glass 61 enters the stirring chamber. Coloring agents are readily available commercially and are usually in the form of dry, pulverized concentrates, which may include a coloring compound such as a metal oxide mixed with a fluxing powder and bound with sodium silicate or some other binder. Alternatively, the additives may be melted separately and fed to the stirring chamber in a molten form as disclosed in U.S. Pat. Nos. 3,343,935 (Keefer et al.) and 3,486,874 (Rough).

The total amount of iron present in the glass is expressed herein in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. The proportion of the total iron in the ferrous state is expressed as the ratio $FeO/Fe_2O_3$.

The radiation transmittance data herein are based on the following wavelength ranges:

| | |
|---|---|
| Ultraviolet | 300–400 nanometers |
| Visible (luminous) | 400–770 nanometers |
| Infrared | 800–2100 nanometers |

Luminous transmittance ($LT_A$) is measured using CIE standard illuminant A. Total solar energy transmittance relates to the separate transmittance as follows:

$$TSET=0.44LT_A+0.53TS/R+0.003TSUV$$

where TSIR is total solar infrared transmittance and TSUV is total solar ultraviolet transmittance.

EXAMPLE I

In a glass melting and refining operation essentially as shown in FIGS. 1 and 2, color additive was stirred into the refined glass at a rate of about 0.85% to 1.0% by weight of the glass. The additive was a color concentrate identified as KG-947-B by its manufacturer, Ferro Corporation, Orrville, Ohio, and contained about 40% iron in the form of magnetite ($Fe_3O_4$). The glass had 0.118% total iron before the addition and 0.479% to 0.495% total iron after the addition. The ratio of FeO to total iron after addition ranged from 0.47 to 0.55, and $SO_3$ content was 0.003% to 0.005%. The resulting glass in a 5 millimeter thickness exhibited $LT_A$ of 68.4% to 69.3% and infrared transmittance of 11.2% to 13.9%.

EXAMPLE II

In a glass melting and refining operation essentially as shown in FIGS. 1 and 2, an iron-containing additive was included in the batch mixture in the amount of 1.9% by weight of the batch. The additive was "Melite 40" a nearly sulfur-free $CaO—Al_2O_3—SiO_2$ slag containing about 20% by weight total iron, with about 80% of the iron in the form of FeO sold by the Calumite Company, Boca Raton, Fla. The batch mixture also included 0.025% by weight powdered coal to enhance reducing conditions during melting. Combustion burners in the liquefying stage were operated with reducing flames at a volume ratio of 1.9 parts oxygen to one part methane. The resulting glass had a total iron content of 0.449% to 0.473%, with a ratio of FeO to total iron of 55.6% to 60.6%. At a thickness of five millimeters, the glass exhibited $LT_A$ of 68.6% to 69.9% and infrared transmittance of 10.9% to 12.9%.

The above two examples disclose two additives that serve as iron sources with a relatively high ferrous content. Other sources of iron in a reduced state include metallic iron powder, iron silicide (FeSi) and iron oxalates ($Fe_2(C_2O_4)_3.6H_2O$ or $FeC_2O_4.2H_2O$).

EXAMPLE III

In a glass melting and refining operation as shown in FIGS. 1 and 2, color concentrates were melted in a small furnace and fed in molten form into the stirring chamber at about 2400° F. (1315° C.). The concentrates were KG-947-I containing about 40% by weight total iron, about 60% of that iron being in the form of FeO, and MI-380-B containing about 25% by weight $CeO_2$, both sold by the Ferro Corporation. The iron color concentrates was added at the rate of 12 parts by weight per thousand parts by weight of base glass, and the cerium color concentrate was added at the rate of 20 parts to one thousand parts by weight. The total iron content of the glass increased from 0.082% by weight $Fe_2O_3$ to 0.533% $Fe_2O_3$ in the final glass composition with a ratio of FeO to total iron of 0.522. The final glass composition had 0.44% by weight $CeO_2$ and less than 0.001% by weight $SO_3$. The transmittance properties of a five millimeter thick sample of the glass produced were:

| | |
|---|---|
| $LT_A$ | 70.1% |
| TSIR | 12.3% |
| TSET | 39.4% |
| TSUV | 43.7% |

In Table I, several prior art glass compositions (Composition Nos. 1–4) and their transmittance properties are compared to an example of the present invention (Composition No. 5), all at five millimeters thickness. Composition No. 1 is a standard green tinted float glass commonly sold for automotive use. Luminous transmittance is high, but infrared transmittance is also high. Composition Nos. 2 and 3 are commercial attempts to reduce the infrared transmittance in float glass by increasing the total iron content and represent the approximate upper limits of such an approach using standard glass melting technology. Infrared transmittance is reduced in the compositions, but with a disproportionate reduction in luminous transmittance, and further reductions of infrared transmittance would be desirable. Composition No. 4 has a good combination of relatively high luminous transmittance and low infrared transmittance attained by reducing conditions as evidenced by the relatively high ferrous to total iron ratio. Consistent with the difficulty of continuously melting such a reduced, absorptive glass. Composition No. 4 was available in the past only by melting in pots, and then casting, grinding, and polishing individual plates. Today, such a labor intensive process would virtually preclude offering such a product on a large scale, commercial basis. Composition No. 5, however, closely matches the transmittance properties of Composition 4, but is a continuously produced float glass product in accordance with the present invention. In keeping with one aspect of the invention, Composition 5 is distinguished from the other examples in Table I by a relatively small amount of total iron, high ratio of ferrous to total iron, and low $SO_3$ content.

Figure 3:
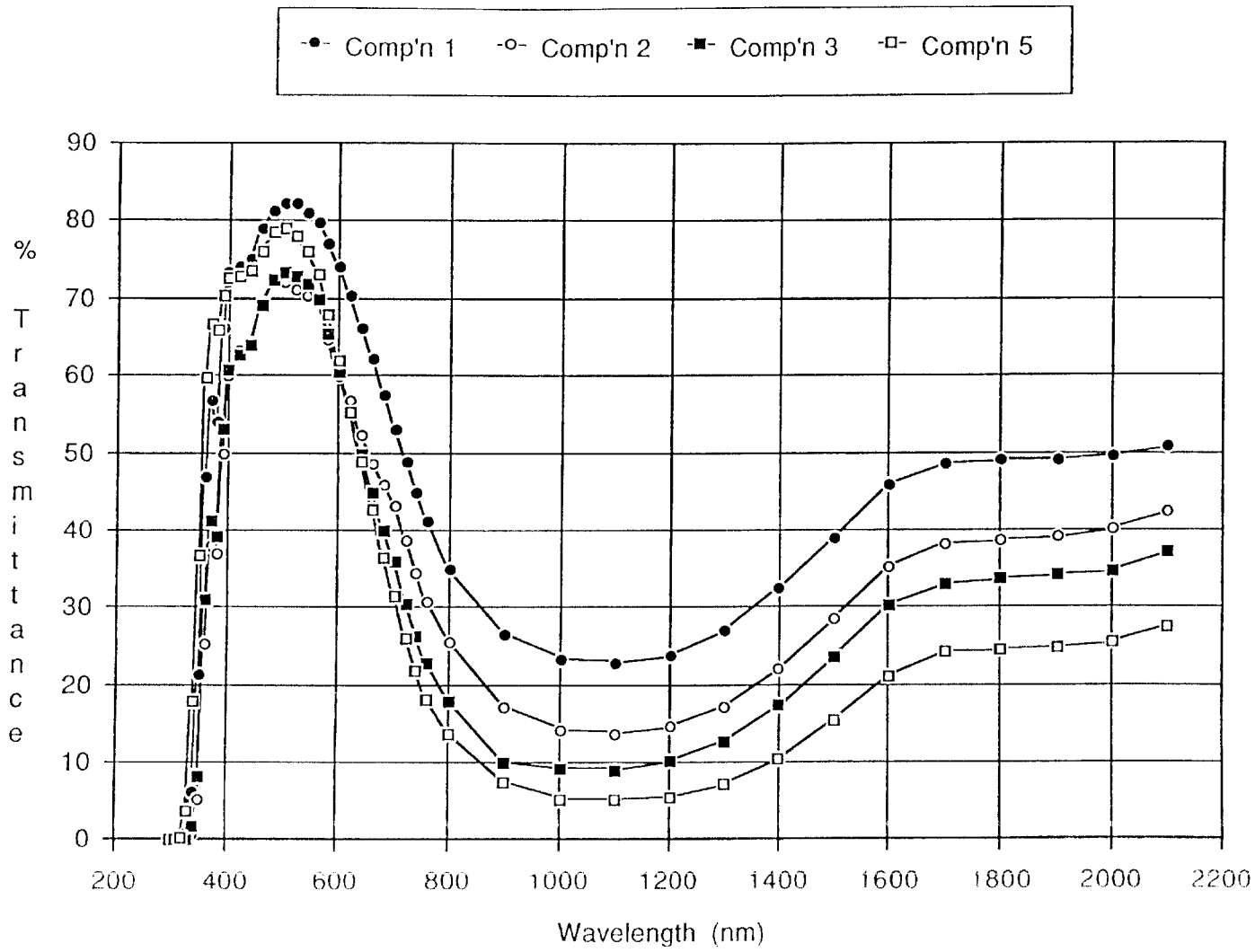
FIG. 3 shows plots of transmittance versus wavelength for several prior art glasses in comparison with an example of the present invention.

FIG. 3 shows plots of transmittance versus wavelength for Compositions 1, 2, 3 and 5 of Table I. In comparison with the prior art Compositions 1, 2 and 3, the present invention represented by Composition 5 can be seen to have a relatively high peak in the visible wavelength region, approaching that of the lightly tinted glass of Composition 1, and a lower curve in the infrared region than even the darkly tinted products of Compositions 2 and 3.

Table II and Table III show variations in the constituents that affect transmittance and at the margins of or within the scope of the invention. All of the compositions in Table II and III have essentially the same base glass composition as Composition 5 in Table I. In addition to variations in the iron which affect luminous transmittance and infrared transmittance, the compositions in Table II show the ability of $CeO_2$, $TiO_2$, $V_2O_5$ and $MoO_3$ to reduce ultraviolet transmittance. Composition 11 is not as reduced as would be desired due to an excess of $CeO_2$. Composition 12 has a relatively large amount of total iron and is only slightly above the minimum reduction level, and as a result has good infrared absorption but marginal luminous transmittance at the five millimeter thickness of the example. It should be understood that at smaller thicknesses the luminous transmittance would be increased without unduly increasing the infrared transmittance, so that Composition 12 could be satisfactory for some applications at thicknesses less than five millimeters. Composition 13 illustrates the detrimental effect on luminous transmittance of attempting to lower the infrared transmittance by increasing the total iron content to high levels. Composition 13 would be useful for the purpose of the present invention only at very small thicknesses and therefore would not be considered a desirable example. Composition 14 through 19 in Table III were melted using magnetite ($Fe_3O_4$) as the iron source and with the inclusion of one half part by weight powdered coal per thousand parts by weight sand to enhance the reducing conditions.

The transmittance at different thicknesses may be calculated from the following relationships:

$$D_1 = \log(91.7/T_1)$$

$$D_2 = \frac{h2}{h1} \times D_1$$

$$T_2 = 91.7/10^{D_2}$$

where:

$D_1$=original optical density $D_2$=new optical density $h_1$=original thickness $h_2$=new thickness $T_1$=original transmittance (percent)

$T_2$=new transmittance (percent)

Examples of the present invention and the prior art have been presented herein with a thickness of five millimeters for the sake of comparison on an equal basis. It should be understood that the thickness may be varied within the usual range of flat glass manufacture (e.g., 2 millimeters to 6 millimeters) to attain desired combination of transmittance properties of the present invention. In general, a composition having a difference of at least fifty between its percent luminous transmittance and its percent infrared transmittance at a given thickness will lend itself to being tailored to the desired combination of transmittance properties of altering the thickness. Larger differences are preferred in that greater versatility is provided in designing the product, and thus a difference of 55 or greater is preferred.

Other variations and modifications as are known in the art may be resorted to within the scope of the invention as defined by the claims that follow.

TABLE I

| | Composition No. | | | | |
|---|---|---|---|---|---|
| | 1 (Prior Art) | 2 (Prior Art) | 3 (Prior Art) | 4 (Prior Art) | 5 |
| | Composition (Weight %) | | | | |
| $SiO_2$ | 72.70 | 70.26 | 72.23 | 71.56 | 73.07 |
| $Na_2O$ | 13.70 | 13.10 | 13.11 | 14.19 | 13.26 |
| $K_2O$ | 0.02 | 0.99 | 0.22 | 0.05 | 0.06 |
| CaO | 8.80 | 8.87 | 8.65 | 12.85 | 8.82 |
| MgO | 3.85 | 3.90 | 3.89 | 0.16 | 3.86 |
| $Al_2O_3$ | 0.10 | 1.75 | 0.70 | 0.25 | 0.23 |
| $SO_3$ | 0.24 | 0.22 | 0.13 | 0.17 | 0.003 |
| $Fe_2O_3$* | 0.539 | 0.739 | 0.800 | 0.606 | 0.514 |
| FeO** | 0.137 | 0.196 | 0.229 | 0.270 | 0.280 |
| $FeO/Fe_2O_3$ total | 0.254 | 0.265 | 0.286 | 0.446 | 0.545 |
| | Transmittance - 5 millimeter thickness | | | | |
| $LT_A$ (%) | 76.9 | 64.8 | 65.1 | 68.8 | 67.8 |
| TSIR (%) | 30.2 | 20.7 | 15.2 | 10.8 | 10.2 |
| TSET (%) | 51.6 | 40.9 | 37.5 | 37.7 | 36.8 |
| TSUV (%) | 43.6 | 28.5 | 31.3 | 43.8 | 53.0 |

*Total iron.

**Total ferrous iron.

TABLE II

| | Composition No. | | | | | | | |
|---|---|---|---|---|---|---|---|---|
| | 6 | 7 | 8 | 9 | 10 | 11 | 12 | 13 |
| Weight % of Total Glass | | | | | | | | |
| FeO | 0.274 | 0.243 | 0.282 | 0.246 | 0.238 | 0.174 | 0.262 | 0.386 |
| $Fe_2O_3$ | 0.495 | 0.492 | 0.603 | 0.613 | 0.591 | 0.574 | 0.643 | 0.952 |
| $FeO/Fe_2O_3$ | 0.554 | 0.494 | 0.468 | 0.401 | 0.403 | 0.303 | 0.407 | 0.405 |
| $CeO_2$ | | | | 0.25 | 0.5 | 1.0 | | 0.25 |
| $TiO_2$ | | | | | | | 0.5 | |
| Transmittance- 5 millimeter thickness | | | | | | | | |
| $LT_A$ (%) | 68.4 | 69.3 | 65.4 | 68.2 | 68.2 | 72.9 | 64.3 | 53.4 |
| TSIR (%) | 11.2 | 13.9 | 9.3 | 12.8 | 13.1 | 22.9 | 10.2 | 3.4 |
| TSET (%) | 37.9 | 39.7 | 35.1 | 38.1 | 38.0 | 45.2 | 34.2 | 25.1 |
| TSUV (%) | 51.9 | 48.6 | 45.4 | 40.7 | 36.3 | 29.2 | 35.3 | 26.1 |

TABLE III

| | Composition No. | | | | | |
|---|---|---|---|---|---|---|
| | 14 | 15 | 16 | 17 | 18 | 19 |
| Weight % of Total Glass | | | | | | |
| FeO | 0.274 | 0.234 | 0.22 | 0.238 | 0.24 | 0.268 |
| $Fe_2O_3$ | 0.517 | 0.516 | 0.556 | 0.581 | 0.512 | 0.591 |
| $FeO/Fe_2O_3$ | 0.478 | 0.453 | 0.396 | 0.41 | 0.469 | 0.453 |
| $CeO_2$ | — | 0.25 | 0.25 | 0.25 | — | — |
| $TiO_2$ | — | — | 1.0 | 0.5 | 1.0 | — |
| $MoO_3$ | — | 0.25 | — | — | — | — |
| $V_2O_5$ | — | — | — | — | — | 0.1 |
| Transmittance 5 millimeter thickness | | | | | | |
| $LT_A$ (%) | 71.4 | 67.1 | 65.4 | 68.4 | 66.5 | 65.0 |
| TSIR (%) | 16.2 | 12.4 | 14.0 | 14.2 | 12.5 | 17.7 |
| TSET (%) | 42.1 | 36.8 | 35.7 | 38.3 | 36.1 | 38.8 |
| TSUV (%) | 51.3 | 32.7 | 22.8 | 34.5 | 33.7 | 33.9 |

We claim:

1. A method of manufacturing soda-lime-silica flat glass in a continuous process including feeding raw materials to a melting operation that includes separate liquefying and refining stages, passing from the melting operation to a flat glass forming operation a continuous stream of molten glass having at least 0.45 percent by weight iron expressed as $Fe_2O_3$, forming the glass into a flat glass product in the forming operation, melting the raw materials in a thin layer in the liquefying stage while controlling oxidation-reduction conditions in that stage and in subsequent stages so as to yield a glass having at least 35 percent of the iron in the ferrous state expressed as FeO and which when formed into a flat glass product of suitable thickness exhibits the combination of luminous transmittance of at least 65 percent and infrared transmittance of no more than 15 percent.

2. The method of claim 1 wherein the glass is provided with a total iron content less than 0.65 percent expressed as $Fe_2O_3$.

3. The method of claim 1 wherein the oxidation—reduction conditions are controlled so as to provide at least 40 percent of the iron in the ferrous state.

4. The method of claim 1 wherein the sulfur content of the product glass is less than 0.02 percent by weight expressed as $SO_3$.

5. The method of claim 4 wherein the ratio of iron in the ferrous state to total iron in the product glass is at least 50 percent.

6. The method of claim 5 wherein the sulfur content of the product glass is less than 0.01 percent by weight expressed as $SO_3$.

7. The method of claim 1 wherein the oxidation-reduction conditions are controlled in the melting operation to yield a glass product having at least 0.23 percent by weight ferrous iron expressed as FeO.

8. The method of claim 7 wherein fuel-rich combustion is provided in the melting operation to provide reducing conditions.

9. The method of claim 7 wherein reducing conditions are provided in the melting operation by including carbonaceous material in the raw materials being fed to the melting operation.

10. The method of claim 1 wherein the raw materials being fed to the melting operation include an iron source in an amount sufficient to yield the desired iron content of the glass product.

11. The method of claim 10 wherein the iron source included in the raw materials includes a majority of the iron in the ferrous stage.

12. The method of claim 1 wherein a source of iron is added to molten glass downstream from the melting operation.

13. The method of claim 12 wherein a substantial portion of the added iron is in a reduced state relative to $Fe_2O_3$.

14. The method of claim 12 wherein a portion of the product glass iron content is provided by an iron source included in the raw materials being fed to the melting operation.

15. The method of claim 1 wherein the molten glass is brought into contact with molten metal prior to the forming operation.

16. The method of claim 15 wherein the molten glass is stirred while in contact with the molten metal.

17. The method of claim 1 wherein the glass is provided with a total iron content less than 0.60 percent expressed as $Fe_2O_3$.

18. The method of claim 15 wherein the forming operation includes supporting molten glass on a pool of molten metal.

19. The method of claim 16 wherein the refining stage includes subjecting molten glass to subatmospheric pressure.

20. The method of claim 17 wherein the sulfur content of the glass is reduced below 0.02 percent expressed as $SO_3$ by the refining stage.

21. The method of claim 7 wherein the oxidation-reduction conditions are controlled in the melting operation to yield a glass product having at least 0.25 percent by weight ferrous iron expressed as FeO.

22. The method of claim 1 wherein the glass product has a composition consisting essentially of, on a weight basis: 66 to 75% $SiO_2$, 12–20% $Na_2O$, 7–12% CaO, 0–5% MgO, 0–4% $Al_2O_3$, 0–3% $K_2O$, 0–1% $Fe_2O_3$, and 0–1.5% total of $CeO_2$, $TiO_2$, $V_2O_5$ or $MoO_3$.

23. A soda-lime-silica glass article having a composition consisting essentially of, on a weight basis: 66 to 75% $SiO_2$, 12–20% $Na_2O$, 7–12% CaO, 0–5% MgO, 0–4% $Al_2O_3$, 0–3% $K_2O$, 0.45–1% $Fe_2O_3$, 0–1.5% total of $CeO_2$, $TiO_2$, $V_2O_5$ or $MoO_3$, at least 50 percent of the iron being in the ferrous state expressed as FeO, less than 0.02 percent by weight sulfur expressed as $SO_3$, and exhibiting luminous transmittance of at least 65 percent and total solar infrared transmittance of no more than 15 percent at a selected thickness.

24. The article of claim 23 wherein the ferrous iron content expressed as FeO, is greater than 0.270 percent by weight of the total glass composition.

25. The article of claim 24 wherein the ferrous iron content, expressed as FeO, is less than 0.300 percent by weight of the total glass composition.

26. The article of claim 23 wherein the sulfur content, expressed as $SO_3$, is less than 0.01% of the total glass composition.

27. The article of claim 23 wherein the total iron content, expressed as $Fe_2O_3$, is less than 0.65 percent by weight of the total glass composition.

28. The article of claim 23 comprising a flat glass sheet.

29. The article of claim 28 wherein the sheet is 2 to 6 millimeters thick.

30. The article of claim 28 wherein the sheet has traces of tin oxide in a surface portion.

31. The method of claim 1 wherein the glass is formed to a thickness of 2 to 6 millimeters.

32. The method of claim 31 wherein the transmittance properties are exhibited at a product thickness of 5 millimeters.

*33. A soda-lime-silica glass article having a composition consisting essentially of, on a weight basis: 66–75% $SiO_2$, 12–20% $Na_2O$, 7–12% CaO, 0–5% MgO, 0–4% $Al_2O_3$, 0–3% $K_2O$, 0–1.5% total of $CeO_2$, $TiO_2$, $V_2O_5$, or $MoO_3$, optionally residual amounts of refining aids, and less than about 0.55% total iron oxide expressed as $Fe_2O_3$, at least 50 percent of the iron being in the ferrous state expressed as FeO, the iron being present in sufficient quantities to limit total solar infrared transmittance to no more than 15 percent while luminous transmittance is at least 65 percent at a selected thickness.*

*34. A soda-lime-silica glass article having a composition consisting essentially of, on a weight basis: 66–75% $SiO_2$, 12–20% $Na_2O$, 7–12% CaO, 0–5% MgO, 0–4% $Al_2O_3$, 0–3% $K_2O$, 0–1.5% total $CeO_2$, $TiO_2$, $V_2O_5$, or $MoO_3$ and less than about 0.55% total iron expressed as $Fe_2O_3$, at least 50 percent of the iron being in the ferrous state expressed as FeO, the iron being present in sufficient quantities to limit total solar infrared transmittance to no more than 15 percent while the luminous transmittance is at least 65 percent at a selected thickness.*

* * * * *